United States Patent
Fujii

(10) Patent No.: US 10,302,930 B2
(45) Date of Patent: May 28, 2019

(54) OPTICAL APPARATUS FOR PERFORMING OBSERVATIONS AND MEASUREMENTS BY USING IMAGES OF MEASURED OBJECTS

(71) Applicant: Mitutoyo Corporation, Kawasaki, Kanagawa (JP)

(72) Inventor: Nobuyoshi Fujii, Hiroshima (JP)

(73) Assignee: MITUTOYO CORPORATION, Kawasaki (JP)

( * ) Notice: Subject to any disclaimer, the term of this patent is extended or adjusted under 35 U.S.C. 154(b) by 716 days.

(21) Appl. No.: 14/933,553

(22) Filed: Nov. 5, 2015

(65) Prior Publication Data

US 2016/0139396 A1 May 19, 2016

(30) Foreign Application Priority Data

Nov. 13, 2014 (JP) ................................. 2014-230627

(51) Int. Cl.
  *G01B 21/04* (2006.01)
  *G02B 21/26* (2006.01)
  *G02B 21/00* (2006.01)

(52) U.S. Cl.
  CPC ......... *G02B 21/26* (2013.01); *G02B 21/0016* (2013.01)

(58) Field of Classification Search
  CPC .... G02B 21/26; G02B 21/0016; B25J 9/1692; G01B 21/042; G01N 29/30; G01V 13/00; G04D 7/1214
  See application file for complete search history.

(56) References Cited

U.S. PATENT DOCUMENTS

| 3,764,129 A | 10/1973 | Yanagawa |
| 3,812,941 A | 5/1974 | Yanagawa |
| 4,684,225 A * | 8/1987 | Clark ............... G02B 21/26 359/379 |

(Continued)

FOREIGN PATENT DOCUMENTS

| JP | S53-10457 | 4/1978 |
| JP | S55-155251 | 11/1980 |

(Continued)

OTHER PUBLICATIONS

Hideki Kobuchi, Upright Microscope, May 27, 2005, JP2006330467A.*

(Continued)

*Primary Examiner* — Lisa M Caputo
*Assistant Examiner* — Nigel H Plumb
(74) *Attorney, Agent, or Firm* — Rankin, Hill & Clark LLP

(57) ABSTRACT

An optical apparatus including: a stage on which an object is mounted; an observation section including an imaging system forming an image of the object; a shaft rotatable in a first direction and a second direction opposite to the first direction; a drive that moves the observation section or the stage in a third direction defying a gravity according to rotation of the shaft in the first direction and in a fourth direction opposite to the third direction according to rotation of the shaft in the second direction; and a torque controller including a clutch that permits rotation of the shaft in the first direction, inhibits rotation of the shaft in the second direction, and rotates in the second direction with the shaft as a rotation force in the second direction is input to the shaft, and a restriction section restricting rotation of the clutch.

19 Claims, 4 Drawing Sheets

(56) References Cited

U.S. PATENT DOCUMENTS

| | | | |
|---|---|---|---|
| 4,947,213 A | | 8/1990 | Murata et al. |
| 2009/0162049 A1 | | 6/2009 | Maruyama |
| 2014/0293293 A1 | * | 10/2014 | Vodnick ............... G01B 21/047 |
| | | | 356/614 |

FOREIGN PATENT DOCUMENTS

| | | | |
|---|---|---|---|
| JP | S58-77852 | | 5/1983 |
| JP | S60-048857 | | 3/1985 |
| JP | S60-211415 | | 10/1985 |
| JP | S61-121045 | | 6/1986 |
| JP | S61-269137 | | 11/1986 |
| JP | 06-006159 | * | 1/1994 ............... H03H 3/02 |
| JP | H06-6159 A | | 1/1994 |
| JP | H06-038200 | | 2/1994 |
| JP | H07-250219 | | 9/1995 |
| JP | 2001-007592 | | 1/2001 |
| JP | 2006-014907 | | 1/2006 |
| JP | 2009-159015 | | 7/2009 |
| JP | 2010-054877 | | 3/2010 |

OTHER PUBLICATIONS

Fujita Corp. Shearing reinforing structure of column beam connection part in reinforced concrete structure, Sep. 16, 1997, JP 09-242181A.*
Japanese Office Action dated May 31, 2018, 3 pages.
Japanese Office Action dated Feb. 19, 2019 with English translation, 6 pages.

* cited by examiner

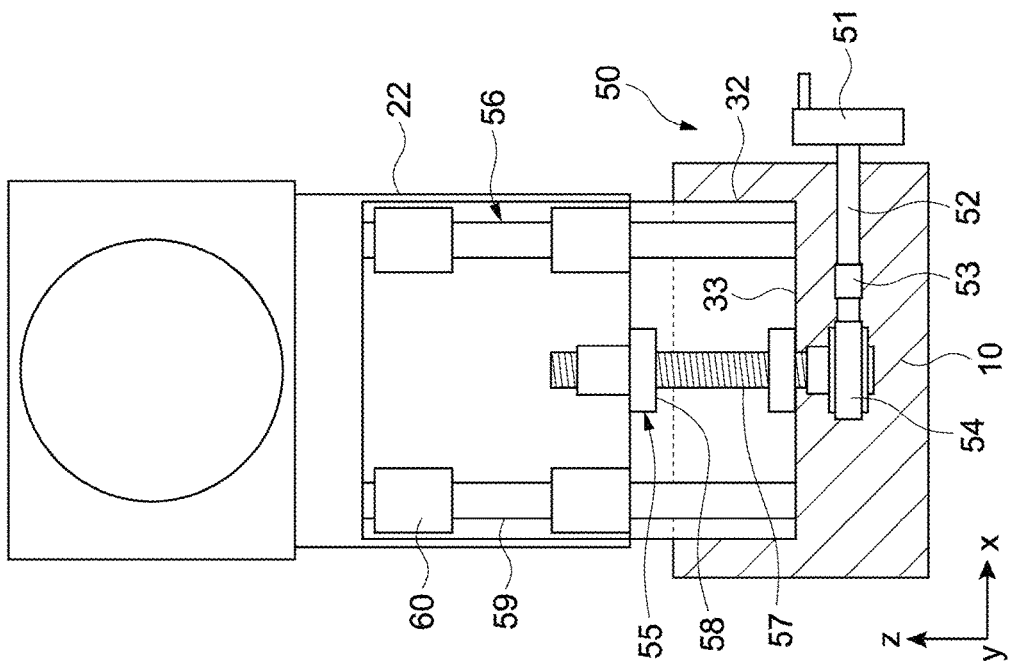
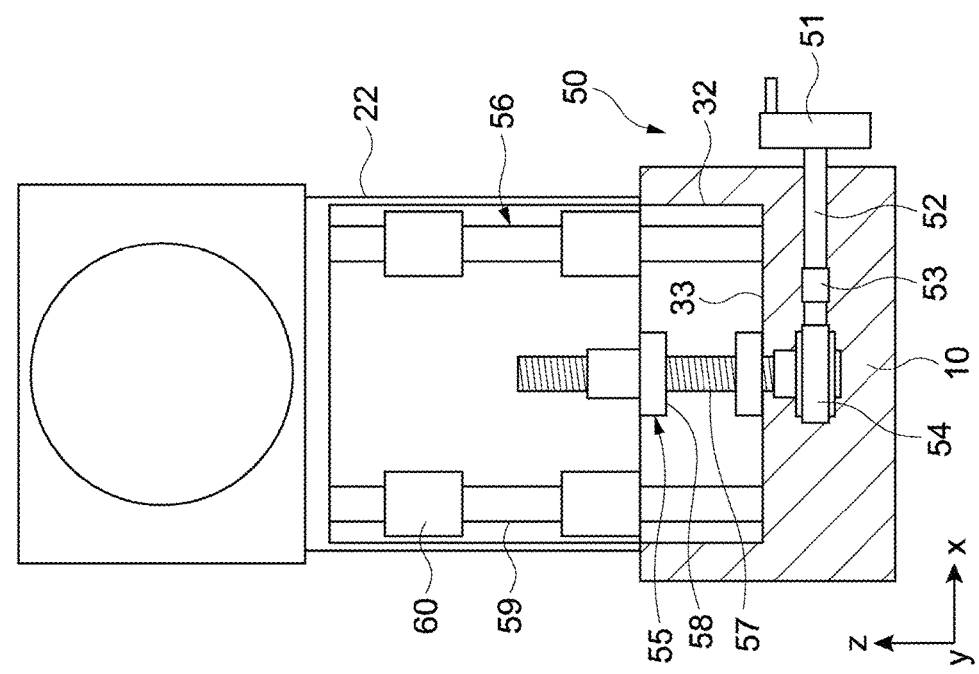

OPTICAL APPARATUS FOR PERFORMING OBSERVATIONS AND MEASUREMENTS BY USING IMAGES OF MEASURED OBJECTS

CROSS REFERENCE TO RELATED APPLICATIONS

This application claims the benefit of Japanese Priority Patent Application JP 2014-230627 filed Nov. 13, 2014, the entire contents of which are incorporated herein by reference.

BACKGROUND

The present disclosure relates to an optical apparatus that performs observations and measurements based on work images.

From the past, optical apparatuses that form images of works by optical systems each including an objective lens and an imaging lens and perform observations and measurements based on the work images have been known. For example, in a measurement projection apparatus, an image of a work is projected by a projection section, and the projected work is visually measured. Also in an image measurement apparatus, an image of a work is projected by a digital camera or the like, and a measurement or the like is performed based on the digital image. In the optical apparatuses as described above, it is important to highly-accurately focus on a work image.

The focusing is performed by relatively moving a stage on which a work is mounted and a measurement head on which an imaging optical system is mounted in a vertical direction, for example. Typically, one of the stage and the measurement head is moved upwardly or downwardly by rotating a rotation handle. By the weight of the stage or the measurement head, a difference may be caused between a rotation torque requisite for the raising and a rotation torque requisite for the lowering. An increase in the difference between the rotation torques requisite for the upward and downward movements induces lowering of operability of the optical apparatus.

Japanese Patent Application Laid-open No. Hei 06-6159 (hereinafter, referred to as Patent Document 1) discloses, though in a totally different field, a brake unit obtained by combining a friction-type brake and a one-way clutch. By using the brake unit, it is possible to equalize the rotation torques requisite for lowering and raising a lifter plate on which an automobile or the like is mounted (see, for example, left column of page 3 in Patent Document 1).

SUMMARY

Also in the optical apparatus, a technique that suppresses a difference between torques requisite for raising and lowering a stage or a measurement head and enables focusing to be performed with high operability is desired.

In view of the circumstances as described above, there is a need for an optical apparatus capable of performing focusing with high operability.

According to an embodiment of the present disclosure, there is provided an optical apparatus including a mounting section, an observation section, a shaft section, a drive section, and a torque control section.

On the mounting section, an object is mounted.

The observation section includes an imaging optical system that forms an image of the object mounted on the mounting section.

The shaft section is rotatable in a first direction and a second direction opposite to the first direction.

The drive section moves one of the observation section and the mounting section in a third direction that defies a gravity according to a rotation of the shaft section in the first direction and in a fourth direction opposite to the third direction according to a rotation of the shaft section in the second direction.

The torque control section includes a clutch section that permits the rotation of the shaft section in the first direction, inhibits the rotation of the shaft section in the second direction, and rotates in the second direction with the shaft section as a rotation force in the second direction is input to the shaft section, and a restriction section that restricts the rotation of the clutch section.

In the optical apparatus, the rotation of the shaft section in the first direction is permitted by the clutch section. Therefore, it is possible to move the observation section or the mounting section in the third direction defying the gravity without increasing requisite torques. On the other hand, when a rotation force in the second direction is input to the shaft section, both of the shaft section and the clutch section rotate, and the rotation of the clutch section is restricted by the restriction section. Accordingly, a torque that acts on the shaft section due to the weight of the observation section or the mounting section can be controlled. As a result, focusing can be performed with high operability.

The clutch section may include a one-way clutch provided in the shaft section and a plate-like section that is formed in a circumferential section of the one-way clutch and rotates with the shaft section in the second direction. In this case, the restriction section may include one or more pressing members that are pressed against the plate-like section to restrict the rotation of the plate-like section.

With this structure, torque control can be performed with a simple structure.

The plate-like section may include at least one surface that is pressed by the one or more pressing members.

With this structure, the rotation of the plate-like section can be restricted sufficiently.

The plate-like section may include a first surface and a second surface that oppose each other in an extension direction of the shaft section. In this case, the restriction section may include a first pressing member that presses the first surface of the plate-like section and a second pressing member that presses the second surface of the plate-like section.

By sandwiching the plate-like section by the first pressing member and the second pressing member, the rotation of the plate-like section can be restricted for sure.

The restriction section may include a first supporting surface that supports the first pressing member toward the first surface and a second supporting surface that is provided while a distance thereof from the first supporting surface is changeable in the extension direction of the shaft section and supports the second pressing member toward the second surface.

By changing the distance between the first and second supporting surfaces, forces with which the first and second pressing members press the plate-like section can be changed. Therefore, torque control can be executed highly accurately.

The restriction section may include a first supporting section including the first supporting surface, a second supporting section including the second supporting surface, whose position with respect to the first supporting section is changeable in the extension direction of the shaft section, and a fixing section that fixes the position of the second supporting section with respect to the first supporting section.

By separately providing the first supporting section including the first supporting surface and the second supporting section including the second supporting surface, the distance between the first and second supporting surfaces can be changed with ease.

The fixing section may include a fixing hole formed on the first supporting section, a through hole formed on the second supporting section, and a fixing member that penetrates the through hole to be inserted into the fixing hole.

Since the fixing member penetrates the through hole formed in the second supporting section to be inserted into the fixing hole of the first supporting section, the position of the second supporting section can sufficiently be prevented from fluctuating.

The plate-like section may be formed annularly about the shaft section. In this case, the first pressing member and the second pressing member may each include one or more washer members.

By using the washer, the torque control section can be realized with a simple structure.

The one or more washer members may include a wave washer.

By using the wave washer, a pressing force with respect to the plate-like section can be controlled. As a result, highly-accurate torque control becomes possible.

As described above, according to the embodiment of the present disclosure, focusing can be performed with high operability. It should be noted that the described effects are not necessarily limited and may be any of the effects described in the disclosure.

These and other objects, features and advantages of the present disclosure will become more apparent in light of the following detailed description of best mode embodiments thereof, as illustrated in the accompanying drawings.

BRIEF DESCRIPTION OF DRAWINGS

FIGS. 3A and 3B are schematic diagrams showing structural examples of an elevating mechanism.

DETAILED DESCRIPTION OF EMBODIMENTS

Hereinafter, an embodiment of the present disclosure will be described with reference to the drawings.

Figure 1:
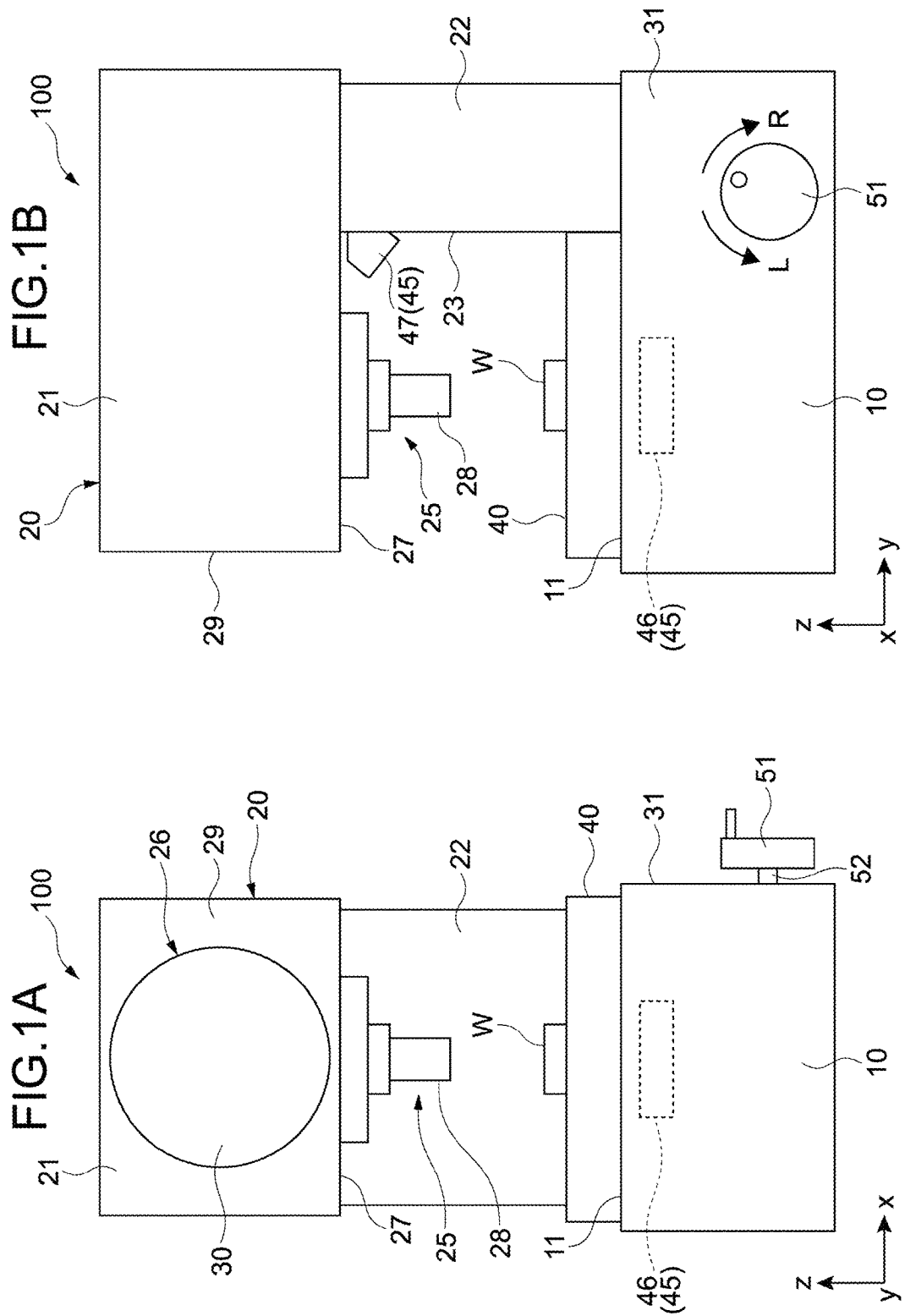
FIGS. 1A and 1B are diagrams each schematically showing an outer appearance of a projection apparatus as an optical apparatus according to an embodiment of the present disclosure.

FIG. 1 are diagrams each schematically showing an outer appearance of a projection apparatus as an optical apparatus according to an embodiment of the present disclosure. FIG. 1A is a front view of the projection apparatus 100 (in y direction), and FIG. 1B is a side view of the projection apparatus 100 (in x direction).

The projection apparatus 100 includes a base section 10, an observation section 20, a stage (mounting section) 40, and an illumination section 45. The base section 10 is a part to be mounted on a desk or the like and has a practically cuboid shape in this embodiment.

In an area substantially ¾ the area from a front side (left-hand side in FIG. 1B) to a rear side (right-hand side in FIG. 1B) of an upper surface 11 of the base section 10, the stage 40 on which a work (object) W is mounted is provided. The stage 40 is connected to an x-axis movement mechanism and a y-axis movement mechanism (both of which are not shown). As the movement mechanisms are operated by a user or driven automatically, the stage 40 becomes movable in the x and y directions. Specific structures of the movement mechanisms are not limited.

The observation section 20 includes a head section 21 and a supporting column section 22. As shown in FIG. 1, the supporting column section 22 is provided on the rear side of the upper surface 11 of the base section 10 at a position next to the stage 40. The supporting column section 22 has a substantially cuboid shape and extends in a z direction.

The head section 21 is coupled to an upper surface section of the supporting column section 22. The head section 21 includes an imaging optical system 25 that forms an image of the work W mounted on the stage 40 and a projection optical system 26 that projects the formed image of the work W.

As shown in FIG. 1, the imaging optical system 25 includes an objective lens 28 provided on a lower surface 27 of the head section 21 at a position opposing the stage 40. The imaging optical system 25 also includes various optical members (not shown) such as an imaging lens, that are provided in the head section 21. The structure of the imaging optical system 25 is not limited, and an arbitrary structure may be adopted. Typically, an imaging optical system capable of forming an image while enlarging the image of the work W is used, and the formed enlarged image is projected by the projection optical system.

The projection optical system 26 includes a display section 30 provided on a front surface 29 of the head section 21. The display section 30 is circular, and an enlarged image of the work W is projected onto the display section 30, for example. The user visually checks the projected image of the work W to perform a shape inspection and the like.

The projection optical system 26 also includes various optical members (not shown) such as a reflective mirror provided in the head section 21. The structure of the projection optical system 26 is not limited, and an arbitrary structure may be adopted. For example, a structure in which a part of the imaging optical system 25 also functions as the projection optical system 26 may be adopted.

The illumination section 45 includes a transparent illumination section 46 and a reflective illumination section 47. The transparent illumination section 46 is provided inside the base section 10 at a position below the stage 40. Light emitted from the transparent illumination section 46 is irradiated onto the work W via emission ports (not shown) formed on the upper surface 11 of the base section 10 and the stage 40. The light that has been transmitted through the work W enters the objective lens 28 so that the image of the work W is projected onto the display section 30.

The reflective illumination section 47 is provided on an upper side of a front surface 23 of the supporting column section 22. Light emitted from the reflective illumination section 47 is irradiated onto the work W from an oblique direction. The light reflected by the work W enters the objective lens 28 so that the image of the work W is projected onto the display section 30.

Light may be irradiated from the reflective illumination section 47 toward the objective lens 28 and reflected by the reflective mirror and the like toward the work W. Accordingly, light can be irradiated vertically from above the work W so that the image of the work W that is based on the reflected light can be observed.

As the transparent illumination section 46 and the reflective illumination section 47, an LED light source, a lamp, and the like are used.

As shown in FIG. 1, on a rear side of a side surface 31 of the base section 10, a handle 51 that a user is capable of operating and a shaft section 52 coupled to the handle 51 are provided. When the user turns the handle 51 rightwardly (arrow R in FIG. 1B), the shaft section 52 also turns rightwardly. When the user turns the handle 51 leftwardly (arrow L in FIG. 1B), the shaft section 52 also turns leftwardly. The handle 51 is also an input section for inputting a rotation force to the shaft section 52.

Figure 2:
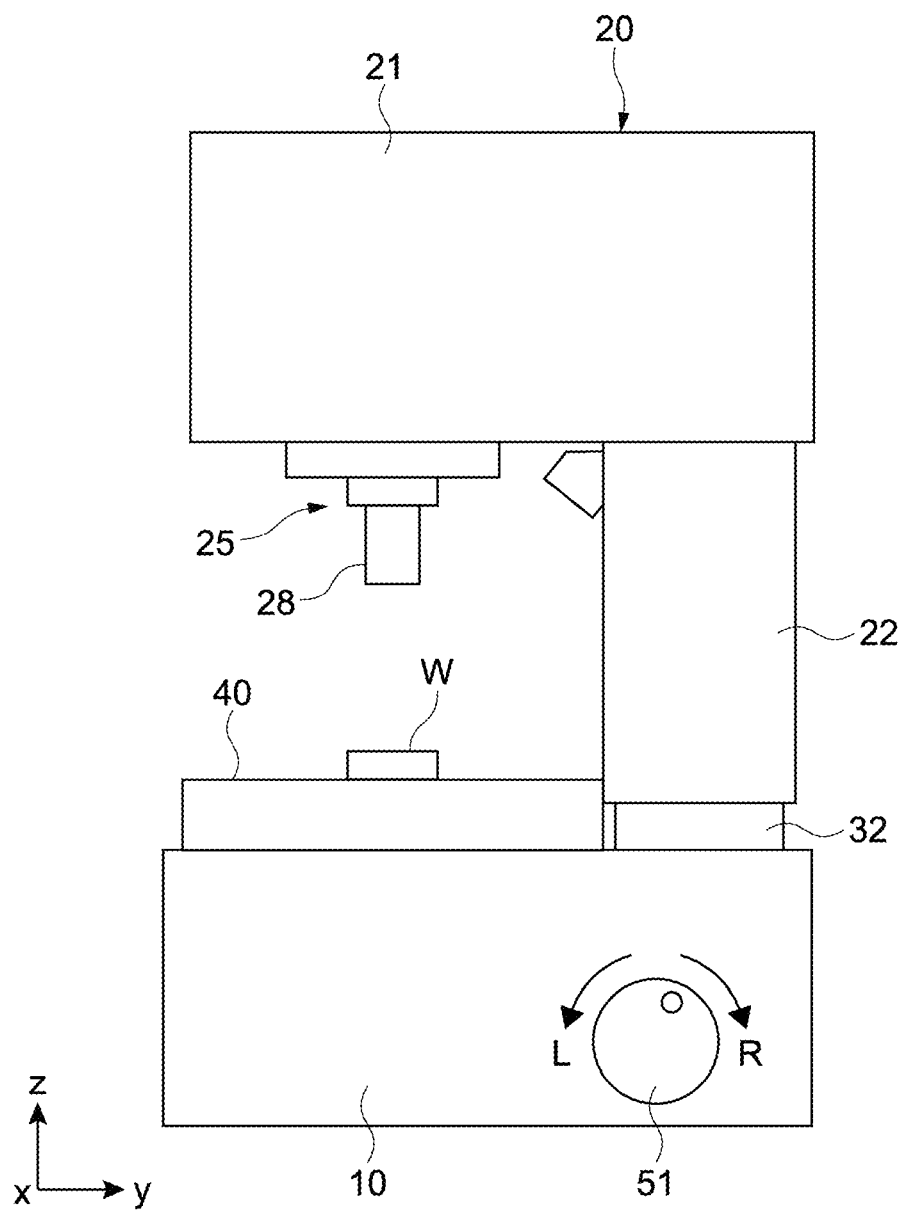
FIG. 2 is a diagram for explaining upward and downward movements of an observation section.

FIG. 2 is a diagram for explaining upward and downward movements of the observation section 20. In this embodiment, the head section 21 and the supporting column section 22 integrally move in the vertical direction along the z direction according to a user operation to the handle 51 (input of rotation force to shaft section 52). As shown in FIG. 2, the supporting column section 22 has a double structure, and an inner-side supporting column section 32 is fixed to the base section 10. The outer-side supporting column section 22 moves in the vertical direction along the inner-side supporting column section 32.

In this embodiment, the observation section 20 moves upwardly according to the rightward rotation (arrow R) of the handle 51 and the shaft section 52. Further, the observation section 20 moves downwardly according to the leftward rotation (arrow L) of the handle 51 and the shaft section 52. The rightward and leftward rotations respectively correspond to a first direction and a second direction opposite to the first direction in this embodiment. Further, the upward direction in which the observation section 20 moves correspond to a third direction that defies a gravity, and the downward direction correspond to a fourth direction opposite to the third direction.

Hereinafter, the elevating mechanism for upwardly and downwardly moving the observation section 20 will be described in detail. By moving the observation section 20 by the elevating mechanism, a focal point of the imaging optical system 25 including the objective lens 28 can be adjusted. As a result, the focal point can be set on the image of the work W. Therefore, the elevating mechanism can also be referred to as focusing mechanism. It should be noted that in the descriptions below, with the inner-side supporting column section 32 being a guide section 32, those two are denoted by the same reference numeral.

FIG. 3 are schematic diagrams showing structural examples of the elevating mechanism of this embodiment. In FIG. 3, the illustration of the stage 40 is omitted. Further, the base section 10 shown in FIG. 3 schematically shows a cross section of an area where the shaft section 52 is provided (position on rear side of base section 10). In actuality, a supporting structure that rotatably supports the shaft section 52 and the like, for example, is structured inside the base section 10.

The elevating mechanism 50 includes the handle 51, the shaft section 52, a torque control section 53, a worm wheel gear 54, a ball screw mechanism 55, and a linear guide 56. The worm wheel gear 54 rotates about the z direction according to the rotation of the shaft section 52. The ball screw mechanism 55 includes a screw shaft 57 connected to the worm wheel gear 54 and a ball screw nut 58 attached to the screw shaft 57. The screw shaft 57 extends in the z direction, and the ball screw nut 58 moves in the vertical direction according to the rotation of the screw shaft 57.

As shown in FIG. 3, the screw shaft 57 extends upwardly from a bottom surface 33 of the guide section 32. The ball screw nut 58 is connected to the supporting column section 22 of the observation section 20, and the supporting column section 22 moves along with the movement of the ball screw nut 58. The structure for connecting the ball screw nut 58 and the supporting column section 22 is not limited.

It should be noted that by appropriately setting a reduction ratio of the worm wheel gear 54, a lead of the ball screw mechanism 55, and the like, a feed amount of the observation section 20 with respect to a rotation amount of the handle 51 can be determined. In addition, the worm wheel gear 54 and the ball screw mechanism 55 function as a drive section in this embodiment.

The linear guide 56 includes guide rails 59 provided inside the guide section 32 and sliders 60 movably attached to the guide rails 59. The guide rails 59 extend in the z direction from the bottom surface 33 of the guide section 32. The sliders 60 are connected to the supporting column section 22 of the observation section 20 and are movable with the supporting column section 22. By providing the linear guide 56, raising and lowering of the observation section 20 can be stabilized.

In this embodiment, two guide rails 59 are provided, and two sliders 60 are respectively attached to the guide rails 59. However, the structure is not limited thereto, and an arbitrary number of guide rails 59 and sliders 60 may be used. The structure that enables the sliders 60 and the supporting column section 22 to move integrally is also not limited, and an arbitrary structure may be adopted.

When the user rotates the handle 51 and a rightward rotation force is input to the shaft section 52, the screw shaft 57 connected to the worm wheel gear 54 rotates, and the ball screw nut 58 moves upwardly. Accordingly, the supporting column section 22 moves upwardly, and the entire observation section 20 moves upwardly (FIG. 3A to FIG. 3B). When a leftward rotation force is input to the shaft section 52, the ball screw nut 58 moves downwardly, and the entire observation section 20 moves downwardly (FIG. 3B to FIG. 3A).

The torque control section 53 permits the rightward rotation of the shaft section 52 and restricts the leftward rotation of the shaft section 52. Therefore, the rightward rotation force input to the shaft section 52 is transmitted to the ball screw mechanism 55 without being restricted. As a result, the observation section 20 can be moved upwardly with a small torque without increasing requisite torques.

On the other hand, by restricting the leftward rotation of the shaft section 52, it becomes possible to control a leftward torque that acts on the shaft section 52 due to the weight of the observation section 20. In other words, a torque acts on the screw shaft 57 in a direction in which the ball screw nut 58 is lowered due to the weight of the observation section 20. The torque acts on the shaft section 52 as the leftward torque via the worm wheel gear 54. The torque control section 53 of this embodiment is capable of restricting the leftward torque.

Consequently, it becomes possible to suppress a difference between torques requisite for raising and lowering the observation section 20 and perform focusing with high operability. Moreover, it also becomes possible to exert a certain amount of drive weight and subtle stop performance in lowering the observation section 20 and thus perform highly-accurate focusing. In addition, it becomes possible to prevent the observation section 20 from gradually lowering due to the weight of the observation section 20 and the observation section 20 from lowering more than the movement amount intended by the user to eventually complicate the focusing. As a result, the operability of the projection apparatus 100 can be improved.

Figure 4:
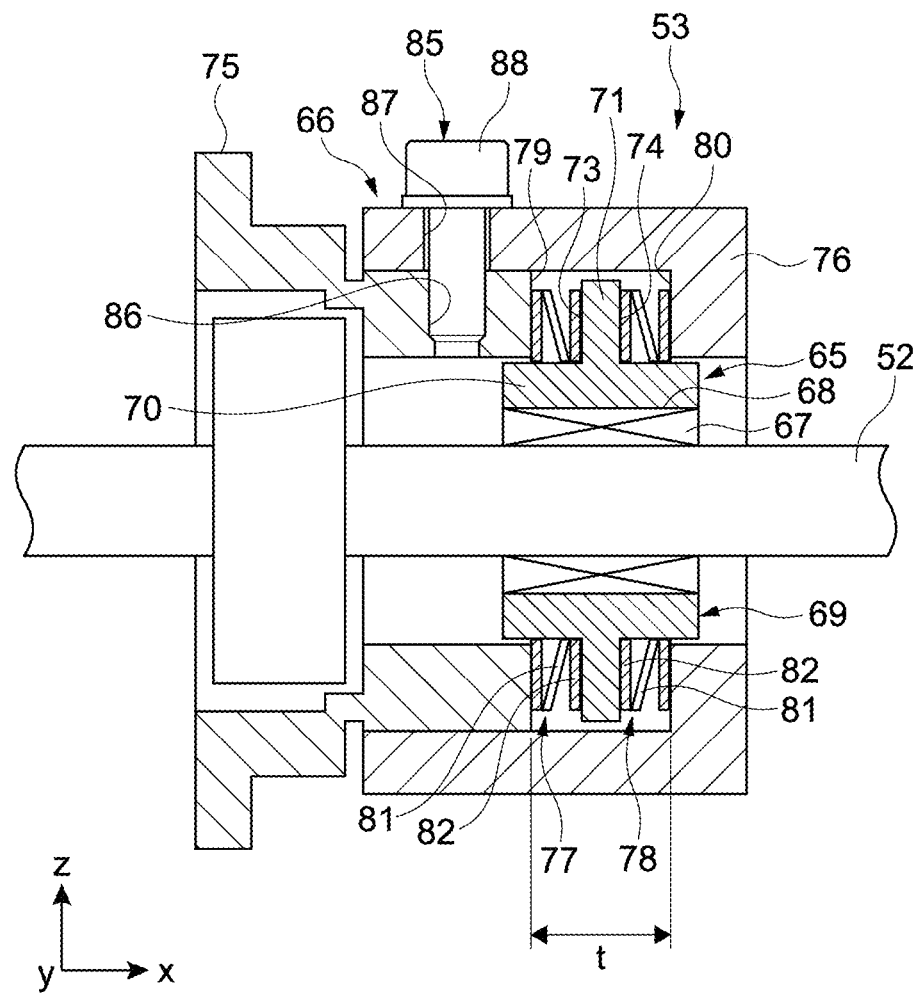
FIG. 4 is a schematic diagram showing a structural example of a torque control section.

FIG. 4 is a schematic diagram showing a structural example of the torque control section 53. The torque control section 53 includes a clutch section 65 and a restriction section 66. The clutch section 65 permits the rightward rotation of the shaft section 52. The clutch section 65 inhibits the leftward rotation of the shaft section 52 and when a leftward rotation force is input to the shaft section 52, rotates leftwardly with the shaft section 52. The torque control is performed by restricting the rotation of the clutch section 65 by the restriction section 66.

As shown in FIG. 4, the clutch section 65 includes a one-way clutch 67 provided in the shaft section 52 and a friction section 69 connected to a circumferential section 68 of the one-way clutch 67. The shaft section 52 is inserted into the one-way clutch 67 so that only the rightward rotation of the shaft section 52 is permitted. The specific structure of the one-way clutch 67 is not limited, and a roller-type one-way clutch or the like is used, for example.

The friction section 69 is integrated with the one-way clutch 67, and when the one-way clutch 67 rotates, the friction section 69 also rotates with the one-way clutch 67. The friction section 69 includes a cylindrical section 70 extending in the same direction as the shaft section 52 and plate-like sections 71 extending vertically toward the outside from the cylindrical section 70. The plate-like sections 71 each have a flange shape when seen from the cylindrical section 70 and extend perpendicular to the shaft section 52.

It should be noted that it is also possible for the one-way clutch 67 and the friction section 69 to be formed separately and connected using an adhesive or the like or connected by being fitted to each other. Various other structures may also be adopted as the structure in which the plate-like sections 71 are provided in the circumferential section 68 of the one-way clutch 67.

As shown in FIG. 4, the plate-like sections 71 are formed at substantially the center of the cylindrical section 70 in the x direction and each include a first surface 73 and a second surface 74 that are vertical to the x direction. The first and second surfaces 73 and 74 have ring shapes that are substantially the same when seen in the x direction.

By pressing one or more pressing members against the plate-like sections 71, the restriction section 66 restricts the rotation of the plate-like sections 71. Accordingly, the leftward rotation of the clutch section 65 is restricted. As shown in FIG. 4, the restriction section 66 includes a first supporting section 75, a second supporting section 76, first washer sections 77 as first pressing members, and second washer sections 78 as second pressing members.

The first supporting section 75 is cylindrical, and the shaft section 52 is inserted into an inner circumferential side thereof. The first supporting section 75 includes a first supporting surface 79 opposing the first surface 73 of the plate-like section 71 of the clutch section 65. The shape of the first supporting surface 79 in the x direction is a ring shape that is substantially the same as that of the first surface 73.

The first supporting surface 79 supports the first washer section 77 interposed between the first supporting surface 79 and the first surface 73 toward the first surface 73. With this structure, the first washer section 77 is pressed against the first surface 73, and the rotation of the plate-like section 71 is restricted.

The second supporting section 76 is also cylindrical, and the shaft section 52 is inserted into an inner circumferential side thereof. The second supporting section 76 includes a second supporting surface 80 opposing the second surface 74 of the plate-like section 71. By the second supporting surface 80, the second washer section 78 is supported toward the second surface 74. With this structure, the second washer section 78 is pressed against the second surface 74 to restrict the rotation of the plate-like section 71. By sandwiching the plate-like section 71 by the first and second washer sections 77 and 78, the rotation of the plate-like section 71 can be restricted for sure. In addition, by adjusting pressing forces that act on the surfaces, subtle torque adjustments become possible.

The first and second washer sections 77 and 78 each include a wave washer 81 and two resin washers 82 sandwiching the wave washer 81. By using the wave washer 81, a surface pressure can be caused in each of the first and second surfaces 73 and 74. As a result, by a friction resistance between each of the first and second surfaces 73 and 74 and the resin washers 82, the rotation of the plate-like section 71 can be restricted for sure. Moreover, by appropriately selecting a different type of wave washer (e.g., having different wave height etc.), the pressing force with respect to the plate-like section 71 can be controlled.

It should be noted that as the resin washers 82, a washer formed of an arbitrary resin material such as a fluorine resin may be used. Also by changing the material of the resin washers 82, the pressing force with respect to the plate-like section 71 can be controlled. The material of the wave washer 81 is also not limited, and a washer formed of stainless steel, for example, may be used. Alternatively, a spring washer may be used as the pressing member.

For example, by adjusting local pressing at a part where the wave washer 81 comes into contact with the resin washers 82, a deformation of the resin washers 82 can be suppressed, and uniform pressing with respect to the plate-like section 71 can be realized. The effects on the deformation of the resin washers 82 and uniform pressing can be enhanced by increasing the thickness or number of resin washers 82. By suppressing the deformation of the resin washers 82 and enabling uniform pressing to be performed, a local abrasion of the resin washers 82 can be suppressed, and durability of the members can be raised.

By using the one-way clutch, the washer members, and the like, the torque control section 53 can be realized with a simple structure. In this case, the torque control section 53 can also be called one-way clutch section.

Also in this embodiment, a distance t between the first supporting surface 79 and the second supporting surface 80 is changeable. Specifically, in this embodiment, the position of the second supporting section 76 with respect to the first supporting section 75 is changeable in the x direction, and by changing the position of the second supporting section 76, the distance t between the first supporting surface 79 and the second supporting surface 80 can be changed.

Although illustrations are omitted, by cutting the screw on the outer circumferential surface of the first supporting section 75 and the inner circumferential surface of the second supporting section 76 to cause the second supporting section 76 to rotate, the second supporting section 76 becomes movable in the z direction. Instead of such a structure, a groove section and convex section that movably fit with each other may be formed so that the first and second supporting sections 75 and 76 can move relatively.

When the distance t between the first and second supporting surfaces 79 and 80 becomes small, a pressing force of the first and second washer sections 77 and 78 with respect to the plate-like section 71 becomes large, and a force with which the rotation of the plate-like section 71 is restricted can be increased. On the other hand, when the distance t increases, the pressing force of the first and second washer sections 77 and 78 with respect to the plate-like section 71 becomes smaller, and a force with which the rotation of the plate-like section 71 is restricted can be decreased. By changing the distance t between the first and second supporting surfaces 79 and 80 as described above, the pressing force that acts on the plate-like section 71 can be changed. As a result, torque control can be executed highly accurately.

When the distance t between the first and second supporting surfaces 79 and 80 is determined, the position of the second supporting section 76 with respect to the first supporting section 75 is fixed by a fixing section 85. The fixing section 85 includes a fixing hole 86 formed on the first supporting section 75, a through hole 87 formed on the second supporting section 76, and a bolt (fixing member) 88 that penetrates the through hole 87 to be inserted into the fixing hole 86.

For example, one fixing hole 86 is formed at a predetermined position of the first supporting section 75. In contrast, a plurality of through holes 87 are formed on an outer circumference of the second supporting section 76. The bolt 88 is inserted into one of the through holes 87 positioned above the fixing hole 86 according to the rotation position of the second supporting section 76.

For example, by controlling the number, intervals, and the like of the plurality of through holes 87, it also becomes possible to minutely control the rotation position of the second supporting section 76. Since the fixing hole 86 is formed at a predetermined position, a fixing task of the bolt 88 becomes easy, and a check on whether the bolt 88 is fixed also becomes easy. However, the structure is not limited thereto, and a plurality of fixing holes 86 may be formed on the first supporting section 75.

For example, a structure in which a hole is not formed on the first supporting section 75 and a retaining screw is inserted into a through hole formed on the second supporting section 76 so as to fix the second supporting section 76 may be adopted instead. With this structure, however, in a case where the retaining screw becomes loose due to oscillations and the like, there is a fear that the second supporting section 76 rotates accompanying the rotation of the plate-like section 71. As a result, the rotation of the plate-like section 71 may not be restricted appropriately. In contrast, in this embodiment, since the second supporting section 76 can be fixed sufficiently using the bolt 88, it is possible to sufficiently prevent the position of the second supporting section 76 from fluctuating.

In the projection apparatus 100 of this embodiment described heretofore, by providing the torque control section 53, focusing can be executed with small torques and substantially the same torques when raising and lowering the observation section 20. In addition, it becomes possible to prevent variations of the movement amounts due to the weight of the observation section 20 and maintain high operability for a significantly long period of time.

Other Embodiments

The present disclosure is not limited to the embodiment described above, and various other embodiments can also be realized.

In the descriptions above, the observation section 20 is raised and lowered by the elevating mechanism 50. However, the stage 40 on which the work W is mounted may be raised and lowered. By applying the present disclosure also in this case, the stage 40 can be moved with high operability.

Further, the movement direction of the observation section 20 or the stage 40 (hereinafter, referred to as movement target section) is not limited to the longitudinal (vertical direction). The present disclosure is applicable also when moving the movement target section in an oblique direction that forms a predetermined angle with respect to the vertical direction. In this case, an upward oblique direction corresponds to the third direction defying the gravity, and the other direction corresponds to the fourth direction.

In the descriptions above, the first and second surfaces 73 and 74 of the plate-like section 71 are pressed by the first and second washer sections 77 and 78 so as to sandwich the plate-like section 71. However, the method and structure for pressing the pressing members against the plate-like section 71 are not limited thereto. For example, torque control may be executed by pressing only one surface provided on the plate-like section. On the other hand, three or more surfaces may be provided on the plate-like section and pressed.

In the descriptions above, the first supporting section including the first surface and the second supporting section including the second surface are structured as separate members. Therefore, by changing the relative positions of those members, the distance between the first and second supporting surfaces can be changed easily. However, it is also possible to structure the first and second supporting surfaces such that the distance becomes changeable within a single member. In addition, the shaft section may be subjected to a hardening process so as to enhance an abrasion resistance and a fatigue strength.

In the descriptions above, the projection apparatus is exemplified as the optical apparatus according to the present disclosure. However, the present disclosure is also applicable to various optical apparatuses that perform observations and measurements using formed images of objects. Examples of such apparatuses include a digital microscope and various image measurement apparatuses.

In the descriptions above, the case where the user manually operates the handle is exemplified. However, the present disclosure is not limited thereto. The present disclosure is also applicable to a case where a motor is connected to the shaft section and the movement target section is moved by driving the motor. With this structure, highly-accurate focusing that uses the motor can be realized, and a load on the motor due to the weight of the movement target section can be reduced. Furthermore, since a motor torque requisite for raising and lowering can impart a certain amount of load to the movement target section when being raised and lowered, driving at a stable speed becomes possible.

At least two of the feature portions of the embodiments described above can be combined. In addition, the various effects described above are mere examples, and other effects may be exerted without limitations.

What is claimed is:
1. An optical apparatus, comprising:
 a mounting section on which an object is mounted;
 an observation section including an imaging optical system that forms an image of the object mounted on the mounting section;
 a shaft section rotatable in a first direction and a second direction opposite to the first direction;
 a drive section that moves one of the observation section and the mounting section in a third direction that defies a gravity according to a rotation of the shaft section in the first direction and in a fourth direction opposite to the third direction according to a rotation of the shaft section in the second direction; and a torque control section including a clutch section that permits the rotation of the shaft section in the first direction, inhibits the rotation of the shaft section in the second direction, and rotates in the second direction with the shaft section as a rotation force in the second direction is input to the shaft section, and a restriction section that restricts the rotation of the clutch section.

2. The optical apparatus according to claim 1,
wherein the clutch section includes a one-way clutch provided in the shaft section and a plate-like section that is formed in a circumferential section of the one-way clutch and rotates with the shaft section in the second direction, and
wherein the restriction section includes one or more pressing members that are pressed against the plate-like section to restrict the rotation of the plate-like section.

3. The optical apparatus according to claim 2,
wherein the plate-like section is formed annularly about the shaft section, and
wherein the first pressing member and the second pressing member each include one or more washer members.

4. The optical apparatus according to claim 3,
wherein the one or more washer members include a wave washer.

5. The optical apparatus according to claim 2,
wherein the plate-like section includes at least one surface that is pressed by the one or more pressing members.

6. The optical apparatus according to claim 5,
wherein the plate-like section is formed annularly about the shaft section, and
wherein the first pressing member and the second pressing member each include one or more washer members.

7. The optical apparatus according to claim 6,
wherein the one or more washer members include a wave washer.

8. The optical apparatus according to claim 5,
wherein the plate-like section includes a first surface and a second surface that oppose each other in an extension direction of the shaft section, and
wherein the restriction section includes a first pressing member that presses the first surface of the plate-like section and a second pressing member that presses the second surface of the plate-like section.

9. The optical apparatus according to claim 8,
wherein the plate-like section is formed annularly about the shaft section, and
wherein the first pressing member and the second pressing member each include one or more washer members.

10. The optical apparatus according to claim 9,
wherein the one or more washer members include a wave washer.

11. The optical apparatus according to claim 8,
wherein the restriction section includes a first supporting surface that supports the first pressing member toward the first surface and a second supporting surface that is provided while a distance thereof from the first supporting surface is changeable in the extension direction of the shaft section and supports the second pressing member toward the second surface.

12. The optical apparatus according to claim 11,
wherein the plate-like section is formed annularly about the shaft section, and
wherein the first pressing member and the second pressing member each include one or more washer members.

13. The optical apparatus according to claim 12,
wherein the one or more washer members include a wave washer.

14. The optical apparatus according to claim 11,
wherein the restriction section includes a first supporting section including the first supporting surface, a second supporting section including the second supporting surface, whose position with respect to the first supporting section is changeable in the extension direction of the shaft section, and a fixing section that fixes the position of the second supporting section with respect to the first supporting section.

15. The optical apparatus according to claim 14,
wherein the plate-like section is formed annularly about the shaft section, and
wherein the first pressing member and the second pressing member each include one or more washer members.

16. The optical apparatus according to claim 15,
wherein the one or more washer members include a wave washer.

17. The optical apparatus according to claim 14,
wherein the fixing section includes a fixing hole formed on the first supporting section, a through hole formed on the second supporting section, and a fixing member that penetrates the through hole to be inserted into the fixing hole.

18. The optical apparatus according to claim 17,
wherein the plate-like section is formed annularly about the shaft section, and
wherein the first pressing member and the second pressing member each include one or more washer members.

19. The optical apparatus according to claim 18,
wherein the one or more washer members include a wave washer.

* * * * *